Patented Jan. 16, 1951

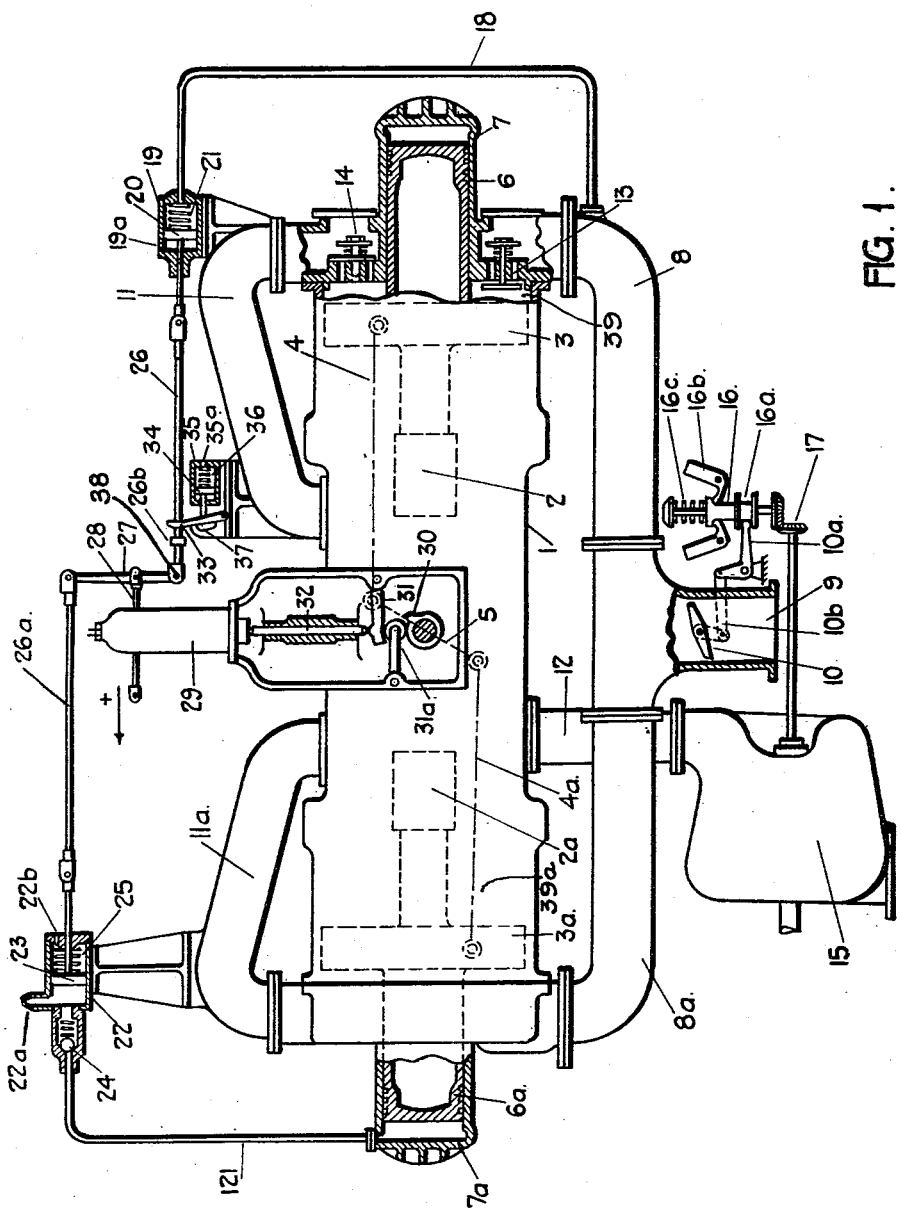

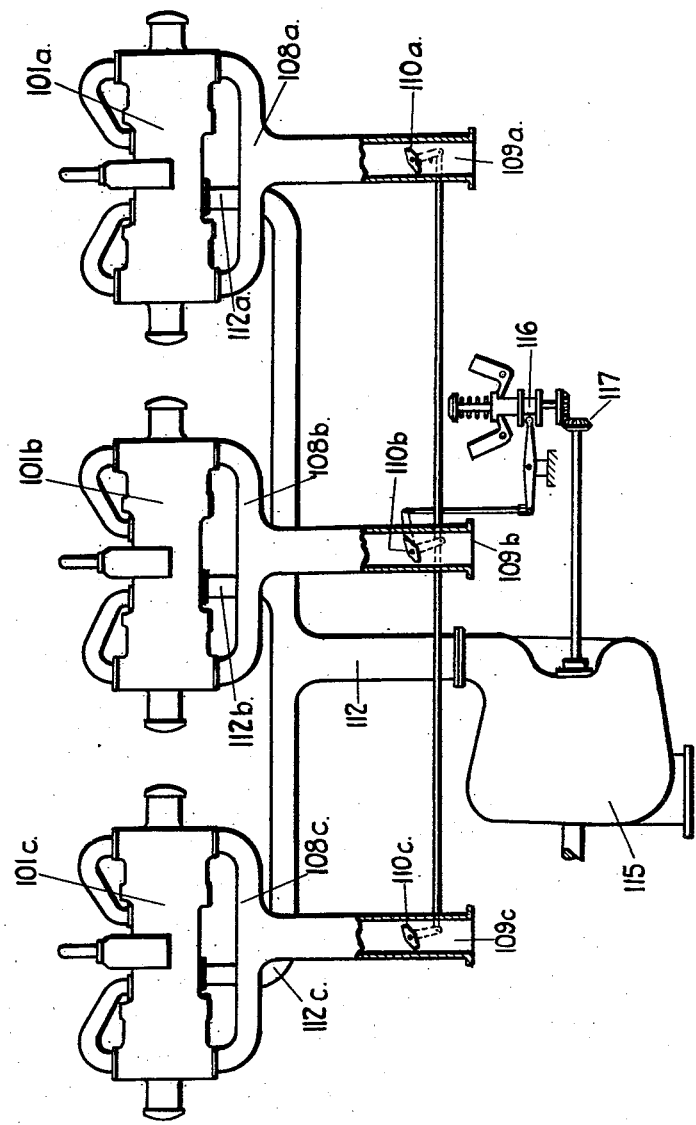

2,538,490

UNITED STATES PATENT OFFICE 2,538,490

GOVERNING OF FREE PISTON TYPE INTERNAL-COMBUSTION COMPRESSORS WITH RESPECT TO BOTH CUSHION CYLINDER PRESSURE AND COMPRESSOR CYLINDER INLET PRESSURE

Robert James Welsh, Rugby, England, assignor to The English Electric Company Limited, London, England, a British company Application May 23, 1946, Serial No. 671,767
In Great Britain May 17, 1945

Section 1, Public Law 690, August 8, 1946
Patent expires May 17, 1965

1 Claim. (Cl. 230—56)

This invention relates to a free piston type internal combustion compressor—i. e. a device wherein a compressor piston is directly connected to or combined with an internal combustion engine piston and wherein the motion of these pistons is not constrained by coupling through connecting rods and cranks to rotating members. There are usually two opposed engine pistons reciprocable towards and away from each other in one cylinder; the engine is usually one operating on a two-stroke compression-ignition cycle, some or all of the air from the compressor serving to scavenge and charge the engine cylinder.

A device of this kind may be used as a gas generator to supply another piece of apparatus such as a gas turbine, which may have as its working fluid either (I) solely air coming direct from the compressor or (II) solely the exhaust from the engine cylinder (comprising the products of the combustion in the engine cylinder mixed with the scavenging air supplied to the engine by the compressor) or (III) a mixture of the engine exhaust with air coming direct from the compressor. The second of these three alternatives is most usual.

If a free piston type internal combustion compressor be used as a gas generator to supply motive fluid to a prime mover (hereinafter referred to as a turbine since it will usually take that form), some arrangement is necessary for controlling the output of the compressor in accordance with the load imposed on the turbine in order to prevent excessive speed fluctuations of the latter or alternatively in some cases such as when the turbine is coupled to a ship's propeller the output of the compressor may require to be regulated in order that the turbine may run at various chosen speeds; such an arrangement will usually comprise some form of speed governor driven by the turbine.

With free piston gas generators it is known to control the output by regulating the fuel supply to the engine either manually or under the control of a speed governor on the turbine in such a manner as to operate the generator with a variable length of piston stroke, a long stroke occurring at the greater outputs as a direct result of the increased fuel supply to the combustion cylinder driving the pistons farther outwards, and a short stroke occurring at lesser outputs due to the decreased fuel supply associated with lower outputs being insufficient to drive the piston assemblies through the full available length of stroke. This method of output control has the disadvantage that the range of output obtainable is extremely limited because of the inability of the generator to continue operating unless the piston stroke be long enough to provide the necessary scavenge opening through the inlet and exhaust ports of the engine cylinders.

It is also possible to operate the control of the output by regulating the fuel supply in connection with a volumetric-efficiency regulator for the compressor (e. g. a variable throttle in the air inlet to the compressor), whilst maintaining a substantially constant length of piston stroke at all outputs. For example, with a decreasing output, a smaller fuel supply will be required and as a result of this smaller fuel supply, the free piston assemblies will tend not to be driven so far outwards, so that if no other adjustments are made, the stroke will become shorter. If, on the other hand, the fuel setting is maintained constant and the air inlet throttle opening decreased, the volumetric efficiency of the compressor will be lowered, which will result in a lower mean effective pressure in the compressor cylinder throughout the stroke and if no other adjustments are made then the length of stroke will increase because, for a constant fuel setting, the work done in the Diesel cylinder on each cycle (i. e. one outward and one inward stroke) necessarily remains substantially constant and since this work has to be absorbed in the compressor cylinder then the length of stroke multiplied by the mean pressure in the compressor cylinder must be constant.

A combination of these two effects can obviously provide a reduced output with an approximately constant length of stroke. This method of output control has the disadvantage that at all outputs other than full output there is a considerable loss of energy, and consequent loss of efficiency, arising from the passage of the air through the restricted inlet throttle.

It is one object of the present invention partially to overcome the aforementioned disadvantages, and to combine the advantages, of these two methods of control by applying them in such a manner that each of them is operative mainly over that range of control for which it is more suitable while being substantially excluded—allowing for a certain degree of overlapping—from the range of the other.

The invention relates to a free piston type internal combustion compressor in which the control of fuel supply and thus the control of the output of the compressor is effected by means which result in the reduction of output from full output down to an intermediate output, being associated with a marked reduction in length of stroke and a relatively small reduction of volumetric efficiency, whereas still further reductions of output are associated with a substantially constant length of stroke and a marked reduction of volumetric efficiency.

In order to be better understood and readily carried into effect the invention is described in what follows by way of example with reference to the accompanying drawing of which—

Fig. 1 is a diagrammatic view, partly in section, of a free piston type internal combustion compressor according to the invention, and Fig. 2 is a diagrammatic view of group arrangement of internal combustion compressors according to the invention, drawn on a smaller scale.

The body 1 of an opposed piston type free piston internal combustion compressor encloses the working pistons (2, 2a) and the compressor pistons (3, 3a) which are preferably synchronised by a link mechanism (4, 5, 4a) and carry at their ends the cushion pistons (6, 6a) respectively, operating in their cylinders (7, 7a). The compressor cylinders are connected, with the usual automatic inlet valves 13 (one only of which is shown) interposed, to the inlet manifold (8, 9, 8a), the common entrance 9 of which is controlled by a butterfly valve 10. In addition, the compressor cylinders are connected, with the usual automatic discharge valves 14 interposed, to the transfer pipes (11, 11a) leading to the usual inlet ports (not shown) of the common working cylinder of the pistons (2, 2a).

The usual exhaust ports (not shown) of this cylinder are connected by the exhaust pipe 12 to the gas turbine 15, the centrifugal governor 16 of which is driven from the turbine shaft, say by means of a bevel gear 17. The sleeve 16a of the governor is under the opposing influences of the centrifugal masses 16b and of a spring 16c, and operates the aforementioned butterfly valve 10 through a bell crank lever 10a and a link 10b.

The lever 10a is provided to control the output of the complete plant and is shown as connected to and under the control of the turbine governor 16. This particular method of operating the output control lever 10a is, however, shown merely by way of illustration and it will be understood that the output control lever may be equally well operated by any other means. In the case of a plant intended, for example, for marine propulsion, it will usually be most convenient to arrange for this lever to be operated manually by the engine attendant.

One branch, say 8, of the inlet manifold is connected by a pipe 18 to a cylinder 19 of a pressure-responsive device containing a piston 20 which is under the opposing influences of the suction coming from the inlet manifold 8 and of a spring 21. The opposite end of the cylinder 19 is connected to the atmosphere by a vent hole 19a.

One of the cushion cylinders, say 7a, is connected by a pipe 121 to the cylinder 22 of another pressure-responsive device containing a piston 23 which is under the opposing influences of the pressure coming from the cushion cylinder 7a through a spring-loaded non-return valve 24 and of a spring 25. The working side of the cylinder 22 is connected to the atmosphere by a carefully proportioned leak-off 22a while the opposite side of said cylinder is connected to the atmosphere by a vent hole 22b. Thus the pressure sensitive device will respond substantially to the maximum cushion pressure of the immediately preceding stroke as explained in Patent No. 2,425,850, dated August 19, 1947.

The piston rods of the two pistons (20 and 23) are linked by means of connecting rods (26, 26a,) respectively, to the ends of a lever 27 which is pivoted intermediately to the rack 28 of the fuel pump 29. The arrow and plus sign indicate the direction of movement of the rack in the sense of increasing the fuel supply.

The two pressure sensitive devices are connected to the rack 28 in the opposite sense. A reduction of pressure in the inlet manifold 8 will cause the piston 20 to move to the right and rock the lever 27 about its connection to link 26a, thereby moving the rack 28 in the fuel decreasing direction. A reduction of pressure in the cushion cylinder 7a, will, on the other hand, allow the piston 23 to be moved to the left by the spring 25 and rock the lever 27 about its connection to the link 26, thereby moving the rack 28 also to the left and increasing the fuel supply.

The fuel pump 29 is shown, for example, to be operated by a cam 30 connected with the two-armed lever 5 of the synchronising mechanism and acting through rockers (31, 31a) on the piston rod or plunger 32 of the fuel pump.

The connecting rod 26 carries a collar 26b which abuts—after a lost motion—against a stop 33 which may be fixed or may be the end of a lever (as shown in Fig. 1) acting on a piston 34 in a cylinder 35 where it is under the action of a spring 36. The cylinder 35 is open to the atmosphere through a vent hole 35a and is fixed with respect to the casing 1.

The operation of this embodiment of the invention is as follows:

With the inlet throttle 10 wide open the free-pistons (2, 3, and 2a, 3a) will tend to reciprocate with an approximately constant stroke by reason of the connection between the fuel pump rack 28 and the pressure-responsive device (22 to 25) associated with the maximum pressure in one of the cushion cylinders 7a. Any temporary or accidental operation with a greater length of stroke due for example to a slight variation in the explosive force in the combustion cylinder, to unavoidable inaccuracies in the metering of the fuel by the injection pump, or to small fortuitous changes in the frictional forces encountered by the moving pistons, will produce a rise in the maximum pressure in the cushion cylinder 7a and will thus effect a reduction in the fuel supply through the pressure sensitive device (22 to 25) acting on the rack 28 of the fuel pump 29. Similarly any temporary or accidental operation with a shorter stroke caused by slight changes in the various forces acting on the moving parts will result in the fuel supply being increased, so that in both cases the machine will tend towards operation at a substantially constant length of stroke. If the pivot 38 be considered first as being fixed in space, and the pressure responsive device 22 to 25 acting on the fuel pump rack 28 through the link gear 26a and 27 be regarded as a governing mechanism tending to maintain a constant length of stroke as explained above, then any displacement of pivot 38 by movement of link 26 will have the effect of varying the preferred length of stroke which the stroke governing characteristics of parts 22 to 25, 26a and 27 endeavours to maintain. In other words, any movement of link 26 will tend to "trim" the basic stroke length to which the stroke governing mechanism is set.

In the embodiment shown in Fig. 1, the link 26 can be moved by piston 20 and will be so moved whenever there is any change in air pressure in the manifold 8—this movement occurring because the air pressure in manifold 8 acts on the face of piston 20 through the pipe 18. Changes in pressure in the manifold 8 will thus produce changes in the preferred length of free piston stroke which the governing mechanism 22 to 25, 26a and 27 endeavours to maintain. By suitable and obvious proportioning of the parts 20, 21, 27, etc. it is possible to achieve the desired result of it requiring only a relatively slight drop of pressure in the manifold 8 to effect a substantial change in the governed length of the stroke of the free pistons.

When the throttle 10 is wide open, the pressure in manifold 8 will be approximately atmospheric, the rod 26 will be at the extreme left hand end of its limit of travel, and as a result the stroke governing mechanism 22 to 25, 26a and 27 will be set to govern the stroke to its maximum designed value. Under these conditions the free piston gas generator will be running at full power.

Regulation of the output of the free-piston gas generator is achieved by closing the inlet throttle 10, for example under the action of the automatic speed governor 16 of the turbine 15 or through a manually operated control (not shown). Slight closure of the throttle 10 will result in a drop in the absolute pressure in the air inlet manifold (8, 8a). This drop in pressure will act on the rack 28 of the fuel pump 29 through the pressure-responsive device (19 to 21) connected to the inlet manifold 8 and will give rise to a reduction in the fuel supply sufficient to reduce the stroke of the free-pistons (2, 3 and 2a, 3a) to less than its maximum designed value and at the same time the new position of the pivot 38 (which will be further to the right than its previous position) will, as previously explained, have the effect of adjusting the stroke governing mechanism 22 to 25, 26a and 27 to regulate the machine at a shorter length of stroke. This reduced length of stroke will result in a lesser delivery of air from the compressor cylinders 39 and 39a, a lesser flow of scavenge air to the engine, a lesser flow of exhaust gas to the turbine with a consequent reduction in power output from the plant.

The reduced mass flow of air consequent on the reduction in length of stroke will also tend to raise the pressure in the inlet manifold (8, 8a) and reduce the loss of volumetric efficiency caused by the previous throttling.

If the output of the gas generator be gradually reduced in successive stages in this manner by a step by step movement of the throttle 10 towards its closed position then a stage will be reached when further reduction in length of piston stroke will not be feasible as the pistons (2, 3, and 2a, 3a) will already be operating with the minimum length of stroke required to give the requisite operative scavenging opening to the inlet and exhaust ports in the engine cylinder. When this stage is reached the pressure-responsive device (19 to 21) connected to the inlet manifold 8 should have reached the end of its limited travel, the collar 26b abutting against a stop 33 which for the moment should be considered to be non-resilient. Any further reductions in the air pressure in the inlet manifold 8 will then have no further direct effect on the fuel pump rack 28. After this stage has been reached it will still be possible to continue to reduce the output of the gas generator by further movement of the throttle 10 which will then operate to reduce the output merely by directly restricting and reducing the flow of air to the suction valves of the compressor, thus reducing the amount of scavenge air supplied to the engine, consequently reducing the rate of supply of exhaust gas to the turbine and therefore reducing the power output of the plant.

During this second stage of power output reduction, that is after collar 26b is in abutment with stop 33, the machine will operate at a substantially constant length of stroke under control of the pressure-responsive device (22 to 25) associated with the pressure in the cushion cylinders 7a. The stroke will, in fact, tend to increase slightly with increased throttling beyond the stage at which the first pressure-responsive device reaches the end of its travel. This increase of stroke will take place because it requires an increase in the maximum pressure in the cushion cylinder 7a and thus an increase in the length of piston stroke to move the piston 23 of the associated pressure-responsive device (22 to 25) into a position corresponding to a lesser fuel supply.

By an additional feature of the present invention this slight increase of stroke may be avoided; this is accomplished by providing a certain amount of resilience in the stop 33 which limits the motion of the pressures-responsive device (19 to 21). This is achieved in the embodiment shown in Fig. 1 by making the stop 33 a lever acting on the piston 34 in the cylinder 35 so as to compress the spring 36. The suction on the piston 20 is then resisted by the spring 36 in addition to the spring 21 so that even after the collar 26d makes contact with the lever 33 it will still move, although with a very much reduced sensitivity, in response to further decreases in the absolute pressure of the inlet manifold 8 until the suction on the piston 20 is balanced by the two springs 21 and 36 when the end of the movement of piston 20 will be reached. Reductions in manifold pressure after the stop has come into operation may thus be arranged to produce no further decrease in the length of piston stroke, but merely to compensate for the slight increase in stroke which would otherwise occur.

The invention has been described as applied to a free piston gas generator employing a jerk type fuel pump but it will readily be appreciated that it may equally well be applied to machines using the so-called "common rail" system of injection, or indeed to internal combustion fuel control systems of any known type. Similarly the pressure-responsive devices may take other forms such as that of expanding capsules without affecting the general principles of the invention.

The invention is particularly applicable to cases where a number of gas generators operate in parallel to supply one turbine. In such cases either interconnected individual throttles on each gas generator or one master throttle in a manifold connected to the inlets of all gas generators will be under either manual control or the control of a speed governor on the turbine.

This is shown in Fig. 2, in which, for example, three internal combustion compressors (101a, 101b, 101c) are shown so as to represent a group of any number of such compressors. Their exhaust tubes (112a, 112b, 112c) are connected through a common exhaust tube 112 to the gas turbine 115 the speed governor 116 of which is, for example, driven by a bevel gear 117.

Each compressor has a separate inlet manifold (108a, 108b, 108c) controlled by its own valve (110a, 110b, 110c) arranged in the respective inlet tube (109a, 109b, 109c) and all linked to the speed governor 116 as shown or operated in any other suitable way.

What I claim as my invention and desire to secure by Letters Patent is:

A power plant comprising: at least one free piston internal combustion engine compressor adapted to operate as a gas generator for a gas turbine and including a combustion cylinder, at least one compressor cylinder, at least one cushion cylinder and a fuel supply means; an output control system for the said power plant comprising a common output control lever, a throttle at the compressor cylinder inlet of at least one of the said free piston internal combustion engine compressors, each such throttle in operative connection with the said output control lever, a pressure responsive device in supply connection with the said compressor cylinder inlet, a second pressure responsive device in supply connection with at least one said cushion cylinder, a fuel supply control lever connected at a point intermediate to its outer ends to the fuel quantity control member of the said fuel supply means, a link member connecting one end of the said fuel supply control lever to the first said pressure responsive device, a link member connecting the other end of the said fuel supply control lever to the said second pressure responsive device, said link members being connected differentially to the said fuel control lever in a sense to reduce the fuel supply both in response to a decrease in the air inlet pressure and also in response to an increase in the maximum pressure in the said cushion cylinder.

ROBERT JAMES WELSH.

REFERENCES CITED

The following references are of record in the file of this patent:

UNITED STATES PATENTS

| Number | Name | Date |
|---|---|---|
| 2,102,121 | Jänicke | Dec. 14, 1937 |
| 2,147,935 | Steiner | Feb. 21, 1939 |
| 2,344,058 | Pateras Pescara | Mar. 14, 1944 |
| 2,355,177 | Pateras Pescara | Aug. 8, 1944 |
| 2,370,149 | Couch | Feb. 27, 1945 |
| 2,403,398 | Reggio | July 2, 1946 |
| 2,425,850 | Welsh | Aug. 19, 1947 |